US006285629B1

(12) United States Patent
Shigihara et al.

(10) Patent No.: US 6,285,629 B1
(45) Date of Patent: Sep. 4, 2001

(54) METHOD FOR PREVENTING DETERIORATION OF SUBMARINE STRUCTURE AND ULTRASONIC VIBRATION UNIT USED FOR THE METHOD

(75) Inventors: Takanori Shigihara, Ashiya; Masaki Kobayashi, Tsukuba, both of (JP)

(73) Assignees: Richter Corporation; Erocia Corporation, both of (JP)

( * ) Notice: Subject to any disclaimer, the term of this patent is extended or adjusted under 35 U.S.C. 154(b) by 0 days.

(21) Appl. No.: 09/554,755

(22) PCT Filed: Nov. 19, 1998

(86) PCT No.: PCT/JP98/05227

§ 371 Date: Mar. 19, 2000

§ 102(e) Date: Mar. 19, 2000

(87) PCT Pub. No.: WO99/25929

PCT Pub. Date: May 27, 1999

(30) Foreign Application Priority Data

Nov. 19, 1997 (JP) .................................................. 9-317834

(51) Int. Cl.[7] .............................. E02B 1/00; E02D 31/06
(52) U.S. Cl. ............................................................ 367/139
(58) Field of Search ............................................. 367/139

(56) References Cited

U.S. PATENT DOCUMENTS 4,092,858 * 6/1978 Edgerton ............................ 73/170 A
4,297,394 * 10/1981 Wooden et al. ....................... 43/124
5,532,980 * 7/1996 Zarate et al. ......................... 367/139

FOREIGN PATENT DOCUMENTS 5058792 5/1975 (JP) .
4150985 5/1992 (JP) .
9088033 3/1997 (JP) .

OTHER PUBLICATIONS

Mazzola et al., "New Electrical Control Methods of Prevent Power Plant Biofouling", Pulsed Power COnference, Digest of Tech Tenth IEEE International, vol. 1, pp 34–39, 1995.*
Schoenbach et al., "The Effect of Pulsed Electric Fields on Biological Cells: Experiments and Applications", IEEE Transactions on Plasma Science, vol. 25, No. 2, Apr. 1997.*
Schoenbach et al., "Biofouling Prevention with Pulsed Electric Fields", Conf. Rec., 1996 22nd Int. Power Modulator Symposium., Boca Raton, FL, Jun. 1996.*
Abou–Ghazala et al., "Biofouling Prevention with Pulsed Electric Fields", IEEE Transactions on Plasma Science, vol. 28. No. 1, Feb. 2000.*

* cited by examiner

*Primary Examiner*—Ian J. Lobo
(74) *Attorney, Agent, or Firm*—Lorusso & Loud

(57) ABSTRACT

An ultrasonic vibration and a voltage are applied to a submerged marine structure to exert thereon vibrational and electric energies, thereby effecting deterioration prevention of the structure. An ultrasonic vibration unit comprises an ultrasonic vibrator made from a piezoelectric ceramic plate with an electrode on each side thereof; power supply wires connected to the respective electrodes; a support member for fixedly supporting the ultrasonic vibrator and transmitting the ultrasonic vibration to the structure; and a resin coat for protecting the ultrasonic vibrator against seawater. The ultrasonic vibration unit is used for preventing deterioration of the submerged marine structure.

6 Claims, 2 Drawing Sheets

Sea Level
3
Vibration Interface
Vibration Interface
241
11A
103
11B
103
61
⊕
⊕ 61
⊖
⊖
⊕
Power Circuit
201
⊖
PV
231
Vcc
PT
220
R2
S
VA
P
C
Oscillator
fo
222
232
⊖
Ultrasonic Vibration Drive Sea Level
3
Vibration Interface
Vibration Interface
11A
61
103
11B
61
103
PV
241
231
R2
C
232
222
VA
S
220
P
fo
PT
Vcc
201
Power Circuit
Oscillator
Ultrasonic Vibration Drive

METHOD FOR PREVENTING DETERIORATION OF SUBMARINE STRUCTURE AND ULTRASONIC VIBRATION UNIT USED FOR THE METHOD

FIELD OF THE INVENTION

This invention relates to a method of preventing deterioration of a submerged marine structure, and an ultrasonic vibration unit for use in the method.

BACKGROUND ART

A variety of structures including buildings and ships have been placed in the ocean for development of natural resources such as biological, oil, gas and mineral resources, for exploitation of ocean energy, ocean space, seawater, etc, for preservation of environment, etc, or for industrial applications for marine transport, harbor, marine product industry, etc.

In such structures, steel materials are generally employed, although materials are selected considering their purposes, costs, strength, durability, etc.

However, when these structures are placed in seawater, the surface of the structure in contact with seawater becomes a suitable environment for reproduction of marine organisms, and the marine organisms may cling to and thus damage the surface of the structure. On the other hand, since seawater provides a severe corrosion environment to the steel materials, corrosion will grow with time, resulting in deterioration of the structure.

In order to solve such a problem, adequate coating has been performed on the surface of the structure, with periodical repainting.

However, repainting requires removal of old paint, which takes a lot of time and labor, posing a problem of marine pollution due to stripped paint flakes. Also, clinging marine organisms should be removed for repainting, in which case it must be ensured that the removed dead organisms never sink to the bottom of the sea to be decomposed. Such a work must be very difficult.

On the other hand, coating materials have been developed preventing corrosion due to oxidation of the surface of the structure. Although such materials have effects of retarding growth of the corrosion, however, they contain zinc, lead, cupper, etc, raising a problem of environmental pollution due to dissolution of these metals into seawater. In addition, none of these coating materials can prevent clinging of marine organisms, and if they cling to the structure, oxidation is accelerated by oxygen sent out from the marine organisms, causing further growth of the corrosion of the structure.

Alternatively, an idea has been suggested in which a vibration may be applied to the structure. It is reported that vibrating a structure prevents clinging of fungi or algae. However, it has not been clear what type of vibration should be applied and how. In addition, even if no marine organisms cling to the structure, seawater causes rust, resulting in corrosion of the structure.

In view of the foregoing, it is the object of this invention to provide a method of preventing deterioration of a submerged marine structure, capable of preventing clinging of marine organisms and corrosion due to rust, and capable of effecting long life of the structure, and a suitable ultrasonic vibration unit for use in the method.

DISCLOSURE OF THE INVENTION

According to this invention, a method of preventing deterioration of a submerged marine structure is provided which comprises applying an ultrasonic vibration and a voltage to the structure to exert vibrating and electric energies thereon, wherein a power source is connected such that the structure acts as an electrode, and the voltage is applied to the structure from the power source.

Further, according to this invention, an ultrasonic vibration unit for use in preventing deterioration of a submerged marine structure is provided which comprises an ultrasonic vibrator made from a piezoelectric ceramic plate with an electrode on each side thereof, power supply wires connected to the respective electrodes, a support member for supporting fixedly the ultrasonic vibrator and transmitting an ultrasonic vibration to the structure, and a resin coat for protecting the ultrasonic vibrator against seawater.

The method of preventing deterioration of a submerged marine structure according to this invention is characterized in that an ultrasonic vibration and a voltage are applied to the structure to exert thereon vibrational and electric energies. Vibrational energy and electric energy are superimposed, which prevents clinging of marine organisms to the structure and its corrosion due to rust, effecting long life of the structure.

In the method of this invention, the ultrasonic vibrator employed for application of ultrasonic vibration can be either a type in which the vibrator is attached to the structure on the seawater side, or a type in which it is attached to the structure on the inner side not in contact with sea water. In the former type, an ultrasonic vibration unit with an electrical insulating resin coat as described below is preferably used such that it is not short-circuited and durability can be maintained. As for the type of the ultrasonic vibrator, it may be of a flat type made from a piezoelectric material, a film type, a bulk type, or a Langevin type. The frequency of the ultrasonic wave is selected appropriately depending on the thickness and size of the structure, and generally ranges from 10 kHz to 200 KHz, preferably from 50 kHz to 60 kHz.

In the method of this invention, for a voltage to be applied to the structure and for an anticorrosive electric current to be supplied to the same, a power source is connected to the structure such that the structure acts as a cathode, and a voltage is applied to the structure from the power source. In this case, a solar batteries or commercially available batteries can be used as the power supply. Alternatively, an electrode made of a metal, such as Zn, Al or Mg, with larger ionization tendency than the metal constituting the structure may be electrically connected directly to the structure to form a battery, which battery may supply the anticorrosive electric current.

Also, in the method of this invention, instead of supplying the anticorrosive electric current as described above, the power source may be connected such that a voltage is applied to the structure and the structure acts as an electrode, and the voltage may be applied from the power source to the structure. In this case, solar batteries or commercially available batteries can be used.

It is preferable that the voltage applied to the structure is one containing an AC component in synchronization with the vibration waveform of the ultrasonic vibration. In this case, the voltage is preferably a pulsating one in which a DC voltage component and an AC voltage component are superimposed. The difference between the maximum applied voltage and the minimum one is at least 1 V, ranging preferably from about 2 to 4 V. The applied voltage is changed in this way (potential sweep), so that marine organisms can be avoided effectively.

In a preferred embodiment of this invention, the structure is comprised of a plurality of structural members electrically insulated from each other, an ultrasonic vibration is applied to the plurality of structural members, one or a plurality of power sources are connected to the plurality of structural members, and a voltage(s) is applied to the plurality of structural members from the power sources. In this case, adjacent two structural members are adapted to act as a pair of electrodes, and a periodically inversed voltage is preferably applied such that one and the other pair of electrodes have each a different polarity. Also, if there is provided a multiple pairs of structural members, an appropriate number of pairs are grouped into one set, and the structural members in each set may be driven in sequence.

Further, according to this invention, an ultrasonic vibration unit is adopted which is attached to a submerged marine structure on the seawater side. The ultrasonic vibration unit comprises an ultrasonic vibrator made from a piezoelectric ceramic plate with an electrode on each side thereof, power supply wires connected to the respective electrodes, a support member for fixedly supporting the ultrasonic vibrator and transmitting an ultrasonic vibration to the structure, and a resin coat for protecting the ultrasonic vibrator against seawater. The ultrasonic vibration unit can preferably be used not only in the method described above, but also in preventing clinging of marine organisms only through application of an ultrasonic vibration. In this unit, since the ultrasonic vibrator is coated with resin, it is protected against seawater, providing excellent durability. Electric power can be supplied to the ultrasonic unit by solar batteries or commercially available batteries. The ultrasonic vibration unit can be attached to the structure with a fixing method such as adhesion, welding or bolting.

Previously known materials are used for the resin coating. They include, for example, synthetic resins such as epoxy resin, urethane resin, vinyl resin, unsaturated polyester resin, and fluororesin, and several kinds of coating materials made of such synthetic resins.

A preferred embodiment of the ultrasonic vibration unit may be arranged such that the support member is formed with a recess, the ultrasonic vibrator is fitted in the recess fixedly, and then resin coating is performed over the vibrator. Also, a metallic material may be used for the support member, which is provided with legs for attachment to the structure. Such a construction is suitable for the unit to be attached to the structure by welding.

Subject structures of the method of preventing deterioration according to this invention are various ones placed in the ocean, such as ships, seawater conduits, stationary marine structures, floating marine structures such as buoys, and netless marine farms and fisheries as secondary applications.

PREFERRED EMBODIMENT OF THE INVENTION

A preferred embodiment of this invention will be described in detail below.

Figure 1:
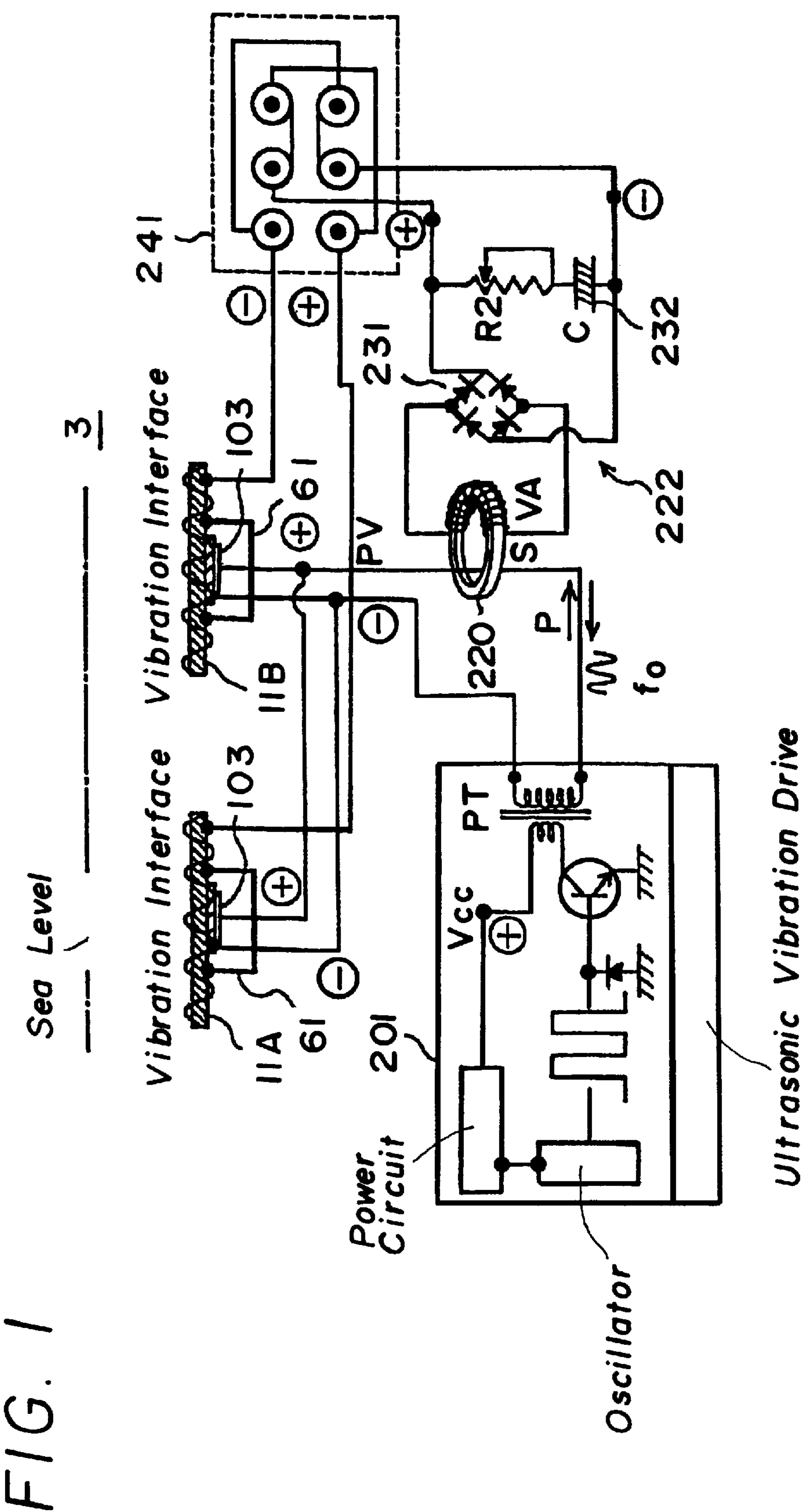
FIG. 1 is a block diagram showing a structure of an apparatus for preventing deterioration according to this invention.

FIG. 1 is a block diagram showing a structure of a deterioration prevention system 3 according to this invention. This deterioration prevention system 3 is arranged such that an ultrasonic vibration and a voltage are applied to a submerged marine structure to exert thereon vibrational and electrical energies simultaneously. In FIG. 1, numerals 11A and 11B designate metallic structural plates constituting parts of the marine structure, both submerged in seawater. The metallic structural plates 11A, 11B constitute surfaces in contact with seawater. On the backsides of the metallic structural plates 11A, 11B are provided covers 61 for protecting the inside thereof against seawater, inside which are attached ultrasonic vibrators 103 to the metallic structural plates 11A, 11B. The ultrasonic vibrators 103 are attached to the metallic structural plates 11A, 11B with insulating adhesive, etc, while electrically insulated from the metallic structural plates 11A, 11B. Drive power supply to the ultrasonic vibrators 103 from an ultrasonic drive control circuit 201 causes the metallic structural plates 11A, 11B to vibrate at a frequency, for example, between 50 kHz and 60 kHz according to the thickness and size of the plates.

A voltage is applied to the metallic structural plates 11A, 11B, together with the ultrasonic vibration by means of the ultrasonic vibrators 103. The power source of electric power supply can be commercially available batteries or solar batteries. Application of the voltage is performed through a waveform control circuit 222. The output voltage from the waveform control circuit 222 is one containing an AC voltage component in synchronization with the waveform of the drive power supplied to the ultrasonic vibrator 103. Therefore, the waveform control circuit 222 is provided with a toroidal core 220 as a booster. The toroidal core 220 has a primary coil through which part of a drive current supplied to the ultrasonic vibrator 103 flows as an input current, and a secondary coil with larger number of turns than the primary coil. An AC voltage induced in the secondary coil is rectified as full-wave by a rectifier 231, and passes through a smoothing circuit consisting of a capacitor 231 and a resistor R2, to turn into a pulsating voltage with a DC voltage component and an AC voltage component superimposed. The output of the smoothing circuit is connected to the metallic structural plates 11A, 11B, and its polarity is inversed at given time intervals by a polarity inversion circuit 241.

After an experiment made with a structure of a steel material placed in the marine environment, using the system described above, it has been verified that effects of both preventing clinging of marine organisms and preventing corrosion due to rust are remarkable.

Alternatively, according to this invention, instead of applying a voltage to the structure, the power source may be connected such that the structure acts as a cathode, and the voltage may be applied from the power source to the structure. Also, an electrode made of a metal, such as Zn, Al or Mg, with larger ionization tendency than the metal constituting the structure may be electrically connected directly to the structure to form a battery, which battery may supply the anticorrosive electric current.

Now, description will be made with reference to FIG. 2 of an ultrasonic vibration unit for use preferably in preventing deterioration of a submerged marine structure according to this invention.

Figure 2:
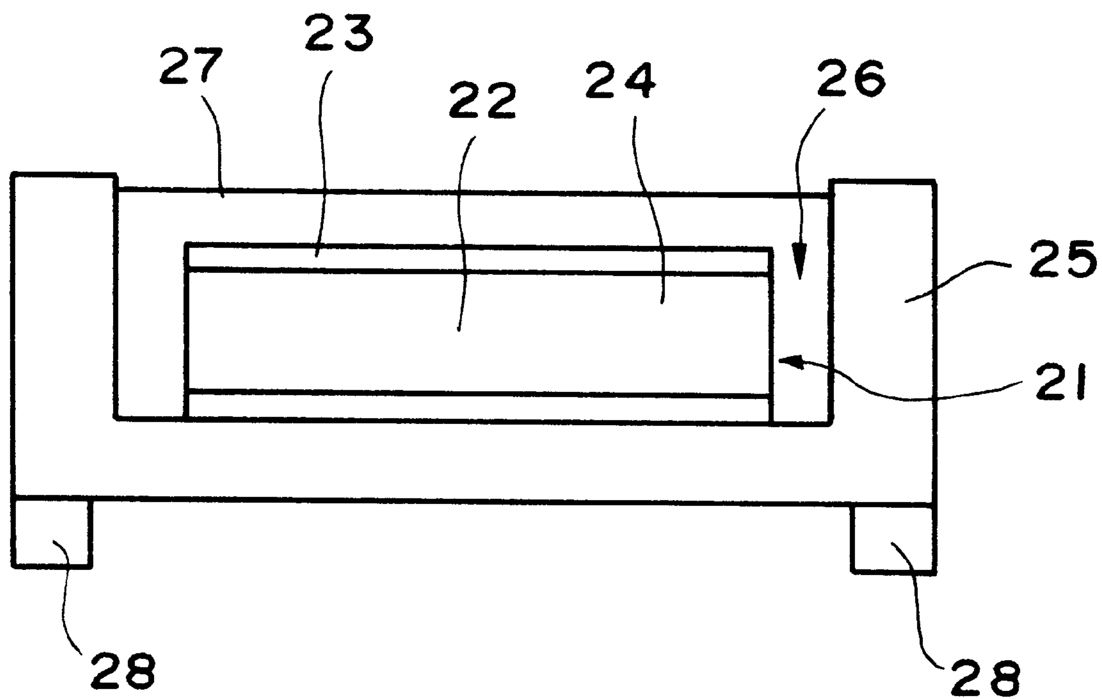
FIG. 2 is a schematic illustration of a structure of an ultrasonic vibration unit according to this invention.

In FIG. 2, numeral 21 designates a flat type ultrasonic vibrator in which on both sides of a piezoelectric ceramic plate 22 are formed electrodes 23, 24, and lead wires for electric power supply (not shown) are connected to these electrodes. The ultrasonic vibrator 21 is supported fixedly with insulating adhesive in a recess 26 formed in a support member 25 made of a metallic material. The ultrasonic vibrator 21 is enclosed with a resin coat 27, which is adapted to protect the vibrator 21 against seawater. In this case, the resin coat can be formed using the above described insulating adhesive. On the four bottom corners of the support member 25 are provided legs 28 for transmitting the ultrasonic vibration and for attachment to the structure. The legs 28 can be made from various kinds of materials, but a metallic material, for example, steel, may be preferable for attachment by welding. The support member 25 itself can be coated with an anticorrosive film for corrosion prevention against seawater. Electric power is supplied to the unit by solar batteries or commercially available batteries. In this way, the ultrasonic vibration unit can be attached easily to the structure on the seawater side by welding or with adhesive, effecting deterioration prevention of the structure.

In the embodiment described above, the ultrasonic vibrator is supported fixedly in the recess formed in the support member, but according to this invention the support member may be of a platelike shape, on which the ultrasonic vibrator is fixed adhesively and enclosed with a resin film.

What is claimed is:

1. A method of preventing deterioration of a submerged marine structure, comprising applying an ultrasonic vibration and a voltage to the structure to exert thereon vibrational and electric energies, wherein a power source is connected such that the structure acts as an electrode, and wherein the voltage is applied to the structure from the power source, the voltage having an AC voltage component in synchronization with the vibrational waveform of the ultrasonic vibration.

2. The method of claim 1, wherein a power source is connected such that the structure acts as a cathode, and the voltage is applied to the structure from the power source.

3. The method of claim 1, wherein a pulsating voltage including a DC voltage component superimposed with an AC voltage component is applied.

4. The method of claim 1, wherein the structure is composed of a plurality of structural members electrically isolated from each other, an ultrasonic vibration being applied to the plurality of structural members, and one or a plurality of power sources are connected to the plurality of structural members, a voltage(s) being applied to the plurality of structural members.

5. The method of claim 1, wherein adjacent two structural members are adapted to act as a pair of electrodes, and a periodically inversed voltage is applied such that one and the other pair of electrodes have each a different polarity.

6. The method of claim 1 wherein the power source applies the voltage to the structure through a waveform control circuit having a primary coil and a secondary coil with a larger number of turns than the primary coil, said method further comprising:

supplying a drive current to the primary coil to induce an AC voltage in the secondary coil;

rectifying the induced AC voltage as full-wave;

passing the rectified voltage through a smoothing circuit to produce a pulsating voltage with a DC voltage component and an AC voltage component superimposed;

inverting the pulsating voltage at intervals of a given time to produce a periodically inverted voltage which is used as the voltage applied to the marine structure.

* * * * *